(12) United States Patent
Chang et al.

(10) Patent No.: US 10,655,704 B2
(45) Date of Patent: May 19, 2020

(54) GEOMETRICALLY NONLINEAR VIBRATION ISOLATION SYSTEM

(71) Applicant: National Applied Research Laboratories, Taipei (TW)

(72) Inventors: Chia-Ming Chang, Taipei (TW); Shieh-Kung Huang, Taipei (TW); Cho-Yen Yang, Taipei (TW)

(73) Assignee: National Applied Research Laboratories, Taipei (TW)

( * ) Notice: Subject to any disclaimer, the term of this patent is extended or adjusted under 35 U.S.C. 154(b) by 0 days.

(21) Appl. No.: 16/259,318

(22) Filed: Jan. 28, 2019

(65) Prior Publication Data

US 2020/0063824 A1 Feb. 27, 2020

(30) Foreign Application Priority Data

Aug. 23, 2018 (TW) .............................. 107129527 A

(51) Int. Cl.
*F16M 13/00* (2006.01)
*F16F 15/023* (2006.01)
*F16F 9/512* (2006.01)
*F16F 9/32* (2006.01)

(52) U.S. Cl.
CPC .......... *F16F 15/023* (2013.01); *F16F 9/3235* (2013.01); *F16F 9/512* (2013.01); *F16F 2228/066* (2013.01); *F16F 2230/0023* (2013.01); *F16F 2238/04* (2013.01)

(58) Field of Classification Search
CPC ........ F16F 15/023; F16F 9/512; F16F 9/3235; F16F 2230/0023; F16F 2228/066; F16F 2238/04
USPC ......................................................... 248/561
See application file for complete search history.

(56) References Cited

U.S. PATENT DOCUMENTS

| 6,938,872 | B2 * | 9/2005 | Nygaard | ................... | F16M 7/00 |
| | | | | | 248/188.8 |
| 2020/0072313 | A1 * | 3/2020 | Chang | ................... | F16F 15/073 |

FOREIGN PATENT DOCUMENTS

JP 2006-031119 A 2/2006
JP 2006031119 A * 2/2006

* cited by examiner

*Primary Examiner* — Todd M Epps
(74) *Attorney, Agent, or Firm* — Muncy, Geissler, Olds & Lowe, P.C.

(57) ABSTRACT

The geometrically nonlinear isolation system of the present invention includes a bearing platform, an isolator and a damper. The isolator is connected with the bearing platform and used for providing resilience against horizontal relative displacement between the bearing platform and the isolator. The damper is pin-jointed to the bearing platform and has an axis orthogonal or oblique to the horizontal direction. Accordingly, when the bearing platform and the isolator move with respect to each other along the horizontal direction, the angle between the axis of the damper and the horizontal direction would change with the horizontal displacement, and the damper provides damping force along a direction parallel to the axis of the damper so as to enhance horizontal vibration isolation effect.

8 Claims, 5 Drawing Sheets

GEOMETRICALLY NONLINEAR VIBRATION ISOLATION SYSTEM

CROSS REFERENCE TO RELATED APPLICATION

This application claims the benefits of the Taiwan Patent Application Serial Number 107129527, filed on Aug. 23, 2018, the subject matter of which is incorporated herein by reference.

BACKGROUND OF THE INVENTION

1. Field of the Invention

The present invention relates to a geometrically nonlinear vibration isolation system and, more particularly, to a geometrically nonlinear horizontal vibration isolation system.

2. Description of Related Art

In recent years, various vibration isolation technologies have been actively developed to reduce the disasters and losses caused by earthquakes. In particular, when precision instruments or equipments in a factory building are damaged by an earthquake, the loss often exceeds the value of the building itself. Therefore, it is very important to develop a vibration isolation technology that can effectively reduce the damage of instruments or equipments in the factory building.

Most of the existing vibration isolation systems use dampers to improve the energy dissipation capability of the system under shaking. In general, the dampers are installed in parallel with the direction of motion to achieve maximum energy dissipation. As shown in FIG. 1, which is a schematic view of a conventional horizontal vibration isolation system 100, a damping element 13 and an elastic element 15 are horizontally installed with a vibration isolation platform 11 to achieve the purpose of energy dissipation in the horizontal direction. However, as the conventional horizontal vibration isolation system is configured with linear isolation mechanism and has fixed isolation frequency, the horizontal displacement and horizontal acceleration of the vibration isolation platform 11 may be amplified under the resonance effect when the excitation frequency is close to the natural frequency of the system, resulting in poor damping effect.

In view of this, it is urgent to develop a nonlinear vibration isolation system with reduced resonance characteristics so as to avoid the response to be excessively amplified under resonance and to overcome the constraints of linear isolation systems, resulting in a wider frequency isolation region and enhanced isolation effect.

SUMMARY OF THE INVENTION

An objective of the present invention is to provide a geometrically nonlinear vibration isolation system, which can exhibit nonlinear isolation effect through a vertically or obliquely installed damper so that the resonance characteristics of the isolation system can be reduced to avoid excessive amplified responses under resonance, thereby effectively reducing the damage on a vibration-isolated object caused by horizontal vibration wave.

In accordance with the foregoing objective, the present invention provides a geometrically nonlinear vibration isolation system, which includes: a bearing platform for a vibration-isolated object disposed thereon; an isolator connected to the bearing platform and configured to cooperate with the bearing platform to constitute a return mechanism for providing resilience against relative displacement in a horizontal direction between the bearing platform and the isolator; and a damper pin-connected to the bearing platform, wherein (i) an axis of the damper is orthogonal to or oblique to the horizontal direction when no external force is applied thereto, (ii) the relative displacement in the horizontal direction between the bearing platform and the isolator induces a change in an angle between the axis of the damper and the horizontal direction, and (iii) the damper provides a damping force along a direction parallel to the axis against the relative displacement.

Accordingly, the geometrically nonlinear vibration isolation system of the present invention can be applied to the vibration isolation of equipment (such as precision instruments or apparatuses) to provide resilience through the return mechanism and exhibit nonlinear isolation effect by the vertically or obliquely installed damper. Thereby, the vibration of the vibration-isolated object in the horizontal direction can be reduced so as to avoid the severe damages on the vibration-isolated object caused by horizontal vibration wave.

In the present invention, the return mechanism may be any mechanism having horizontal return function. For instance, in accordance with a preferred embodiment of the present invention, a sliding return mechanism is used and includes at least one sliding rail and at least one sliding element. The sliding rail has a concave curved surface, and the sliding element slidably abuts and contacts the concave curved surface of the sliding rail. In the initial state without external force (such as seismic force) applied thereto, the sliding element is located at the deepest position of the sliding rail. When an external force is transmitted to the system, the curved sliding motion between the bearing platform and the isolator can provide the return effect against displacement.

In the present invention, the isolator is disposed under the bearing platform, and two opposite ends of the damper are pin-connected to the bearing platform and the isolator, respectively. For further exemplary illustration, the isolator may include a supporting stand and the aforementioned sliding element. The aforementioned sliding element can be formed at the bottom side of the bearing platform. The supporting stand may have a bottom base and at least one bolster element erected on the bottom base. The sliding element is disposed at the top end of the bolster element and between the supporting stand and the sliding rail. Accordingly, the damper has two opposite ends pin-connected to the bearing platform and the bottom base of the isolator, respectively, and disposed vertically or obliquely between the bearing platform and the bottom base.

For the aspect of the damper being installed with its axis orthogonal to the horizontal direction, the increase of relative displacement between the bearing platform and the isolator would cause larger stretching of the damper and smaller slope of the axis of the damper (i.e. larger horizontal component ratio of the damping force). Under medium or small earthquakes (smaller displacement), the system with the vertically or obliquely installed damper exhibits smaller damping ratio and effectively exerts the original performance of the isolation system, resulting in maximum isolation effect. As for large earthquakes (larger displacement), the system with the vertically or obliquely installed damper exhibits larger damping ratio to effectively control the displacement of the vibration isolation layer and provide effective damping mechanism.

In the present invention, the slope of the axis is defined with respect to the horizontal direction. For instance, when the axis of the damper is parallel to the horizontal direction, the slope of the axis is defined as "0". The increased slope of the axis of the damper indicates the reduced horizontal component of damping force provided by the damper.

The foregoing and other objects, advantages, and novel features of the invention will become more apparent from the following detailed description when taken in conjunction with the accompanying drawings.

DETAILED DESCRIPTION OF THE PREFERRED EMBODIMENT

Hereafter, example will be provided to illustrate the embodiments of the present invention. Advantages and effects of the invention will become more apparent from the disclosure of the present invention. It should be noted that these accompanying figures are simplified and illustrative. The quantity, shape and size of components shown in the figures may be modified according to practical conditions, and the arrangement of components may be more complex. Other various aspects also may be practiced or applied in the invention, and various modifications and variations can be made without departing from the spirit of the invention based on various concepts and applications.

Embodiment 1

Figure 1:
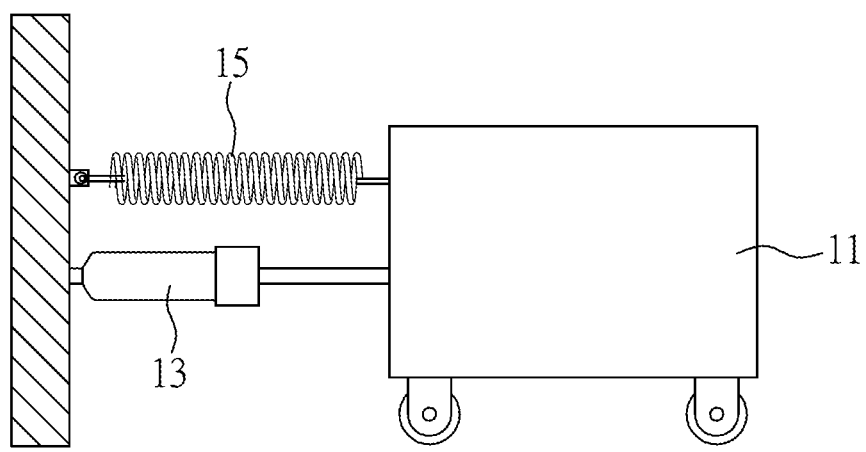
FIG. 1 is a schematic view of a conventional horizontal vibration isolation system.
Figure 2:
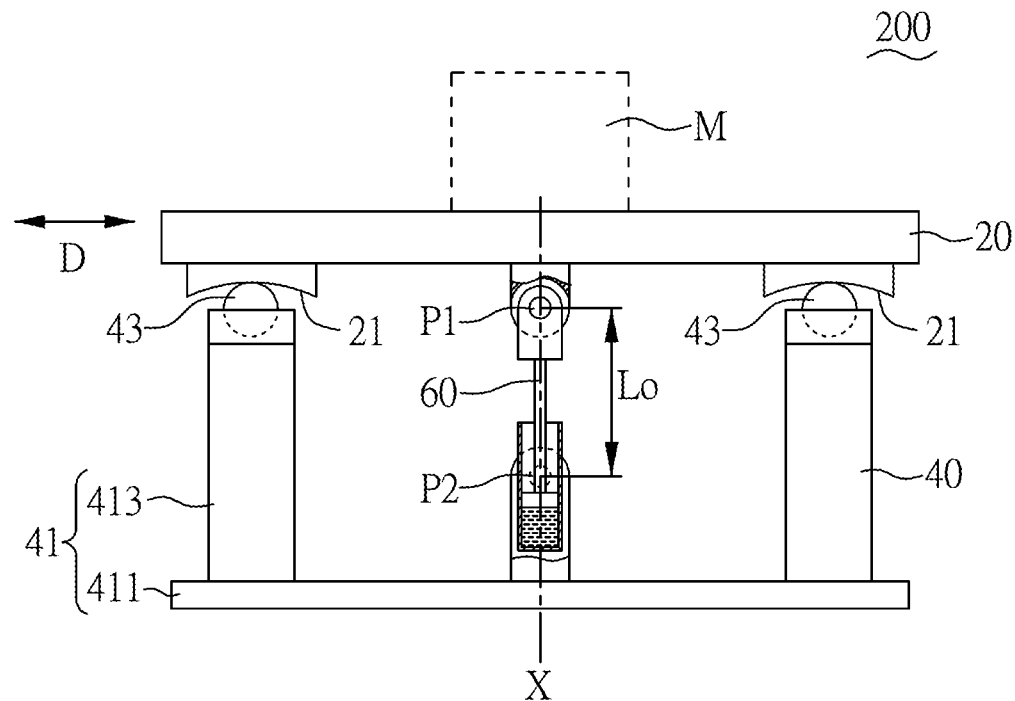
FIG. 2 is a schematic view of a geometrically nonlinear vibration isolation system in accordance with Embodiment 1 of the present invention.
Figure 3:
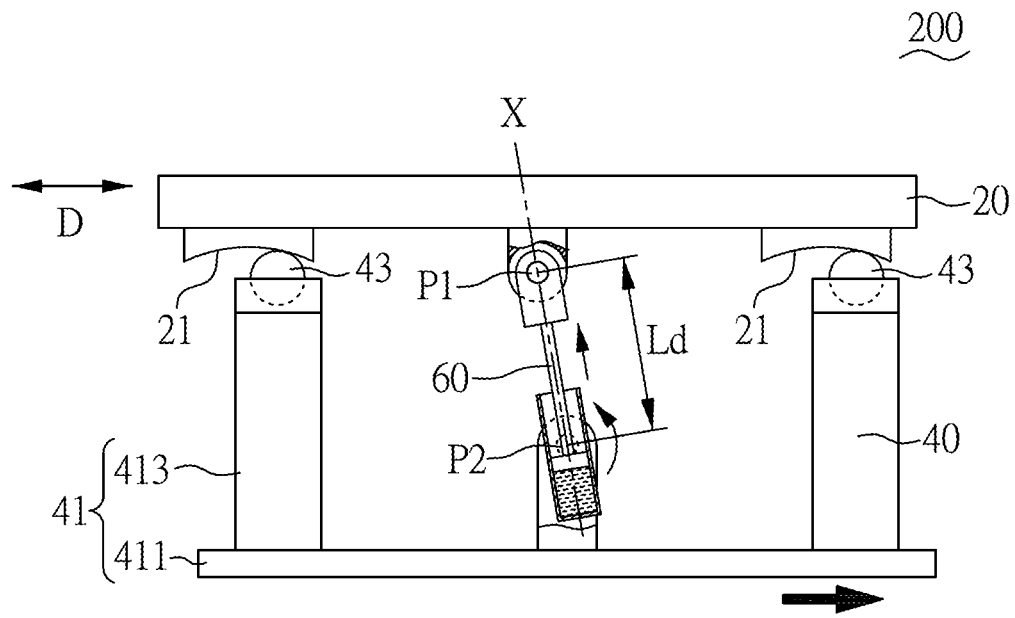
FIG. 3 is a schematic view of a geometrically nonlinear vibration isolation system forced into displacement under external excitation in accordance with Embodiment 1 of the present invention.

Please refer to FIG. 2, which is a schematic view of a geometrically nonlinear vibration isolation system 200 in accordance with one embodiment of the present invention. The geometrically nonlinear vibration isolation system 200 of this embodiment includes a bearing platform 20, an isolator 40 and a damper 60. The bearing platform 20 is provided for a vibration-isolated object M disposed thereon and assembled with the isolator 40 to constitute a return mechanism for providing resilience against horizontal relative displacement between the bearing platform 20 and the isolator 40 so as to reduce and isolate the transmission of horizontal vibration. The damper 60 is pin-jointed to the bearing platform 20 and can provide a damping force against horizontal relative displacement between the bearing platform 20 and the isolator 40. This embodiment is characterized in that the axis X of the damper 60 is orthogonal to the horizontal direction D of the bearing platform 20 (as shown in FIG. 2) at the initial state without external force (such as seismic force) transmitted thereto. Accordingly, when an external force is applied to induce horizontal relative displacement between the bearing platform 20 and the isolator 40, the angle between the axis X of the damper 60 and the horizontal direction D of the bearing platform 20 would change with the horizontal displacement, and the damper 60 provides damping force along a direction parallel to the axis X of the damper 60 (as shown in FIG. 3)

The main components and the association among them of the geometrically nonlinear vibration isolation system 200 in accordance with this embodiment are further illustrated as follows. In this embodiment, a sliding return mechanism is used for exemplary illustration. However, the return mechanism of the present invention may be designed into any other type of mechanism having horizontal return function according to practical requirements. For instance, the elastic resilience of spring or metal also can be applied to offer the horizontal return function.

The isolator 40 of this embodiment includes a supporting stand 41 and two sliding elements 43. The supporting stand 41 has a bottom base 411 and two bolster elements 413 erected and fixed on the bottom base 411. The two sliding elements 43 are disposed at the top ends of the two bolster elements 413, respectively, and slidably abut against the bottom side of the bearing platform 20. Specifically, the bottom side of the bearing platform is formed with concave curved sections as sliding rails 21, and the sliding elements 43 slidably abut and contact the concave curved surfaces of the sliding rails 21, respectively. In the initial state without external force (such as seismic force) applied thereto, the sliding elements 43 are located at the deepest position of the sliding rails 21 (as shown in FIG. 2). When an external force (such as seismic force) is transmitted to the system, the bearing platform 20 and the isolator 40 relatively move with respect to each other along the horizontal direction by sliding mechanism (as shown in FIG. 3). By the concave curved surfaces of the sliding rails 21, resilience can be provided against displacement so as to reduce the impact of vibration waves on the vibration-isolated object M in the horizontal direction. Further, as the two opposite ends of the damper 60 are pin-jointed to the bearing platform 20 and the bottom base 411 of the isolator 40, respectively, the horizontal displacement between the bearing platform 20 and the isolator 40 causes horizontal relative displacement between the two opposite ends of the damper 60, and the damper 60 is forced into an oblique-and-stretched state (as shown in FIG. 3) from the orthogonal initial state (as shown in FIG. 2). Accordingly, the damper 60 in the oblique-and-stretched state can provide damping force along a direction parallel to the axis X. The horizontal component of the damping force can absorb the vibration energy transmitted in the horizontal direction so as to achieve the effect of vibration reduction and vibration isolation.

When no external force is transmitted to the system, the damper 60 keeps the initial state of being vertically disposed between the bearing platform 20 and the bottom base 411. In the initial state, the length between the first joint P1 pin-connected to the bearing platform 20 and the second joint P2 pin-connected to the bottom base 411 is $L_o$ (as shown in FIG. 2). When an external force is applied to induce the relative displacement between the bearing platform 20 and the isolator 40 along the horizontal direction D, the length between the first joint P1 and the second joint P2 of the damper 60 can be stretched to a stretched length $L_d$ (as shown in FIG. 3). The increase in the horizontal relative displacement between the bearing platform 20 and the isolator 40 would cause larger stretching ($L_d$-$L_o$) of the damper 60 and reduced slope of the axis X of the damper 60 (p.s. the reduced slope of the axis X indicates smaller ratio of the vertical component to the horizontal component of the damping force). On the contrary, the decrease in the horizontal relative displacement between the bearing platform 20 and the isolator 40 results in reduced stretching ($L_d$-$L_o$) of the damper 60 and increased slope of the axis X of the damper 60 (p.s. the increased slope of the axis X indicates larger ratio of the vertical component to the horizontal component of the damping force). As the horizontal damping force provided by the damper 60 would nonlinearly change in accordance with trigonometric function, the resonance characteristic of the isolation system can be reduced so as to avoid excessive amplification of responses under resistance and overcome the constraints inherent in linear isolation systems. The pin-jointed length $L_o$ and the damping factor C of the damper 60 are associated with the damping and vibration isolation effect and can be modified according to requirements to achieve the desired vibration isolation effect. Additionally, in the conventional vibration isolation system with horizontally installed damper, the initial position of the horizontally orientated damper is located at half-stroke position in order to permit stretching and compression deformation caused by vibrations in different horizontal directions. However, in the vibration isolation system with vertically installed damper, the damper would be forced into stretching deformation regardless of the direction of horizontal vibration. Therefore, the initial position of the vertically installed damper can be located at the lowest stroke position. Compared to the prior art of horizontally installed damper, the stroke required by the vertically installed damper is smaller, and thus a short-stroke damper can be applied in the vibration isolation system of the present invention so as to reduce the cost of the system.

Embodiment 2

For purposes of brevity, any description in Embodiment 1 above is incorporated herein insofar as the same is applicable, and the same description need not be repeated.

Figure 4:
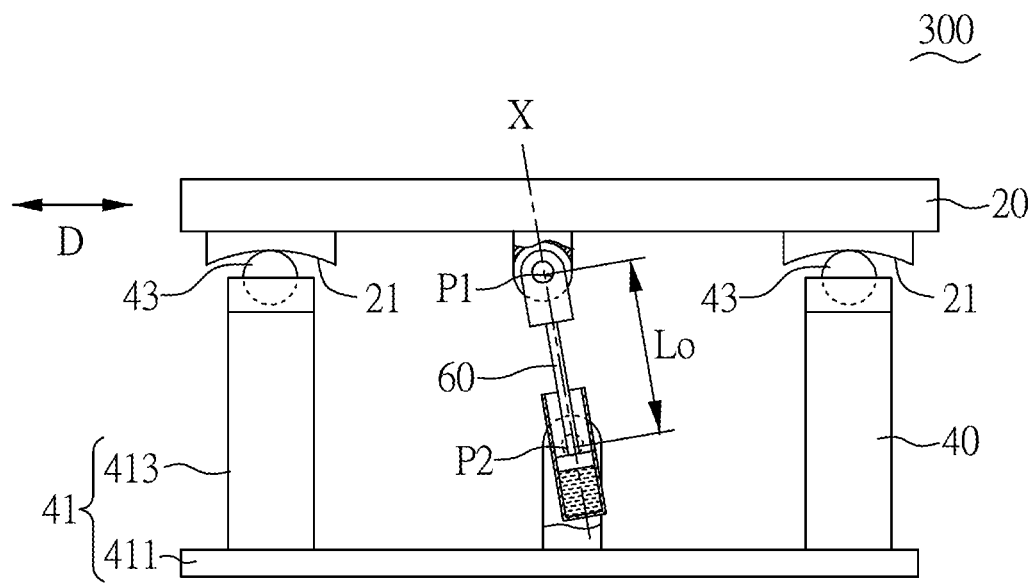
FIG. 4 is a schematic view of another geometrically nonlinear vibration isolation system in accordance with Embodiment 2 of the present invention.

Please refer to FIG. 4, which is a schematic view of another geometrically nonlinear vibration isolation system 300 in accordance with another embodiment of the present invention. The geometrically nonlinear vibration isolation system 300 of this embodiment is similar to that illustrated in Embodiment 1, except that the damper 60 is obliquely disposed between the bearing platform 20 and the bottom base 411.

Figure 5:
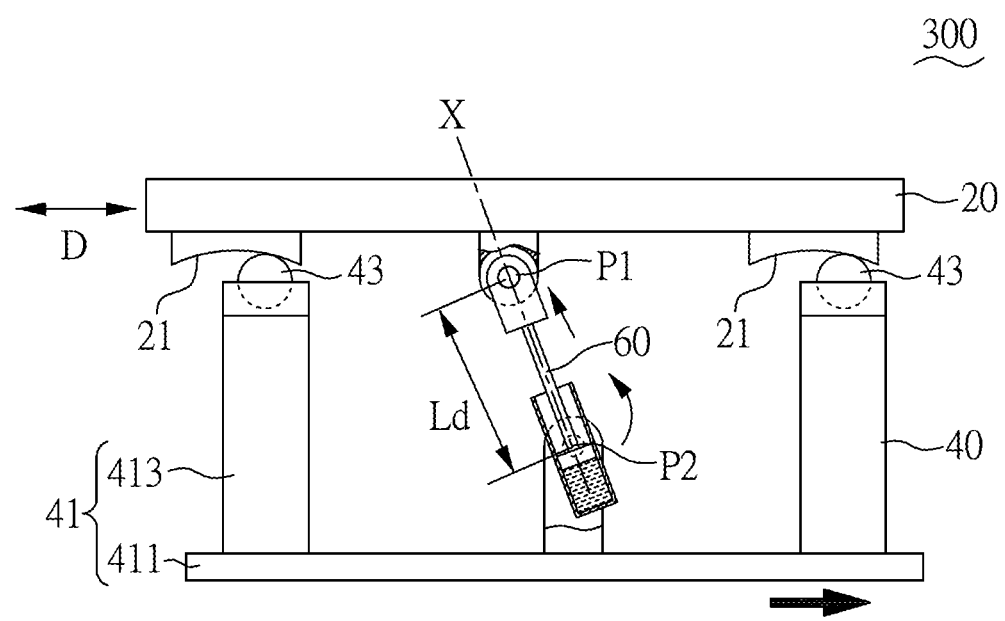
FIGS. 5, 6 and 7 are schematic views of a geometrically nonlinear vibration isolation system forced into different displacement states under external excitation in accordance with Embodiment 2 of the present invention.
Figure 6:
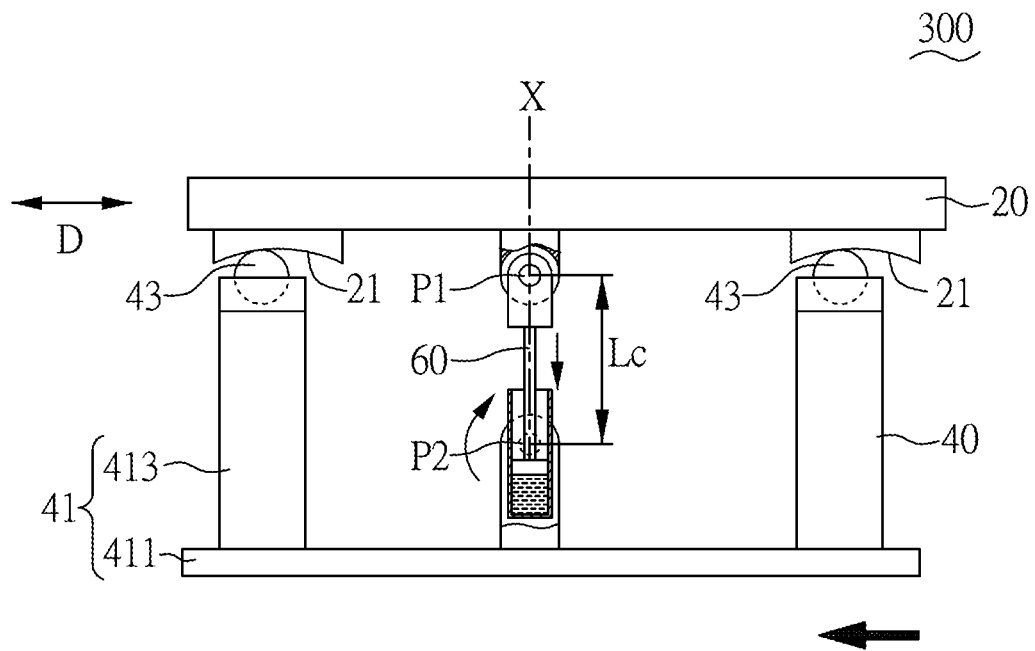
Figure 7:
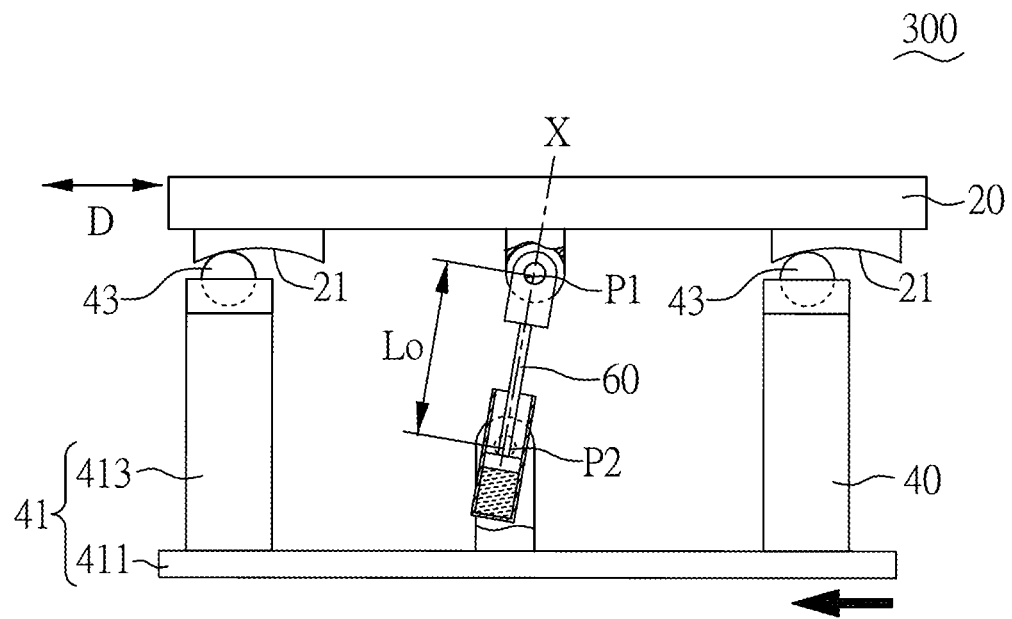

As shown in FIG. 4, when no external force (such as seismic force) is transmitted thereto, the axis X of the damper 60 is oblique to the horizontal direction D, and the sliding elements 43 are located at the deepest positions of the sliding rails 21. When the bearing platform 20 and the isolator 40 relatively move with respect to each other in the direction indicated by the arrow shown in FIG. 5 under external force, the length between the first joint P1 and the second joint P2 of the damper 60 is stretched to a stretched length $L_d$ from the original length $L_0$. The increase in the horizontal relative displacement between the bearing platform 20 and the isolator 40 would cause larger stretching ($L_d$-$L_0$) of the damper 60 and reduced slope of the axis X of the damper 60 (p.s. the reduced slope of the axis X indicates smaller ratio of the vertical component to the horizontal component of the damping force). Additionally, when an external force is applied to cause the relative movement of the bearing platform 20 and the isolator 40 in the direction indicated by the arrow shown in FIG. 6, the length between the first joint P1 and the second joint P2 of the damper 60 is compressed to a compressed length $L_c$ from the original length $L_o$. Under the force shown in FIG. 6, the slope of the axis X of the damper 60 would become larger as the increase of displacement until the damper 60 is in a vertical state as shown in FIG. 6 and reaches the lowest position of stroke. When the isolator 40 continues to move relatively in the direction indicated by the arrow as shown in FIG. 7, the slope of the axis X of the damper 60 becomes smaller as the increase of displacement, and the damper 60 is returned to the original length $L_o$ as shown in FIG. 7 from the compressed length $L_c$ as shown in FIG. 6. Further, when the displacement continuously increases in the same direction, the damper 60 would be further stretched to the stretched length $L_d$ (not shown in figures) from the original length $L_o$.

[Simulation Analysis]

The geometrically nonlinear vibration isolation system as shown in FIG. 2 is subjected to earthquake response analysis of multiple-degrees-of-freedom (MDOF), with the traditional horizontal vibration isolation system as a comparison group. The analysis is executed under the assumption of $L_o$ being 0.25 meters, the vibration-isolated object M being 5 tons, and the period of the isolator 40 being 2 seconds. Design damping ratio is determined based on non-smooth $H_\infty$ synthesis under the purpose of reducing acceleration of the vibration-isolated object. For the traditional horizontal vibration isolation system with the damper horizontally connected to the bearing platform, the linear analysis combined with the design damping ratio is adopted to determine the damping factor. As for the geometrically nonlinear vibration isolation system, the damping factor is obtained by random vibration theory (equivalent linearization method). In the simulation analysis, nonlinear simulation and linear simulation are used to evaluate the acceleration and displacement responses of the vibration-isolated object for the geometrically nonlinear vibration isolation system and the traditional horizontal vibration isolation system, respectively. The results are shown in FIGS. 8 and 9.

Figure 8:
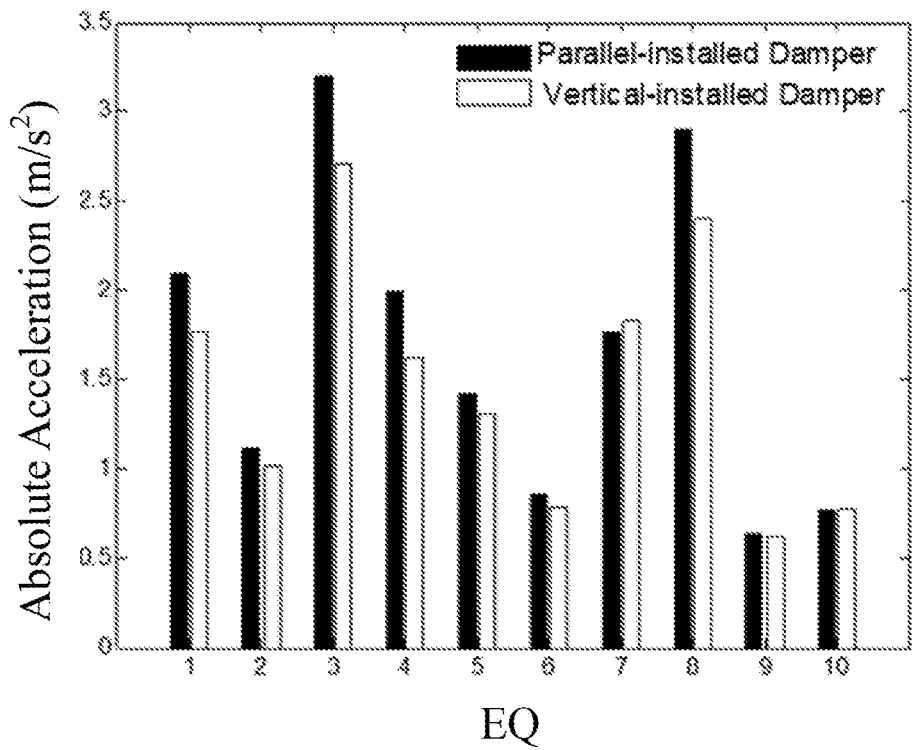
FIG. 8 is an acceleration response graph of the systems with parallel- and vertical-installed dampers.
Figure 9:
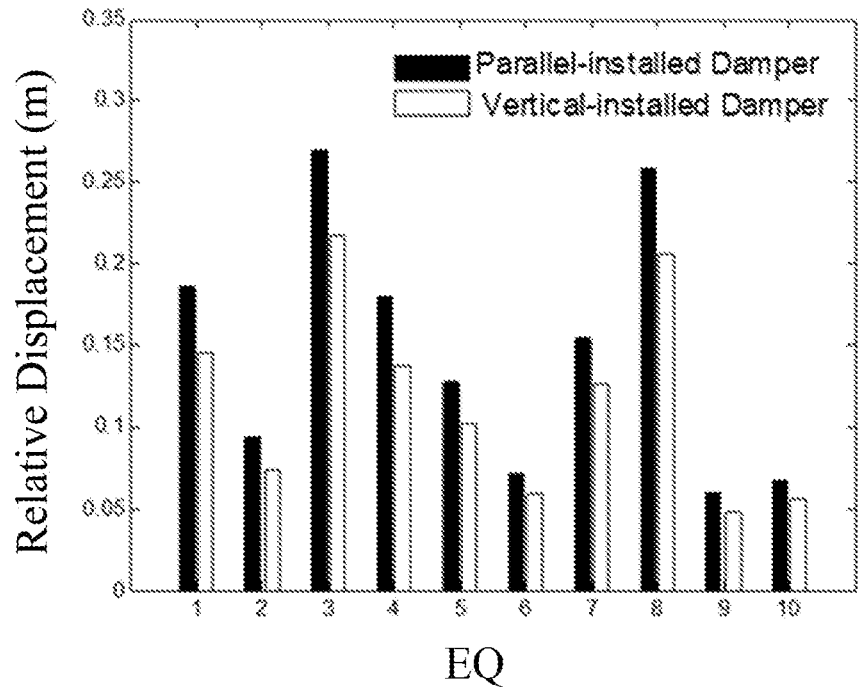
FIG. 9 is a displacement response graph of the systems with parallel- and vertical-installed dampers.

The results indicate that the vibration-isolated object in the geometrically nonlinear vibration isolation system (indicated as "vertical-installed damper" in the figure, damping factor=1) shows lower acceleration (as shown in FIG. 8) and less displacement (as shown in FIG. 9) compared to the traditional horizontal vibration isolation system (indicated as "parallel-installed damper" in the figure, damping factor=0.62833). Therefore, it can be verified that the geometrically nonlinear vibration isolation system is superiors to the traditional horizontal vibration isolation system.

In summary, the geometrically nonlinear vibration isolation system of the present invention can be applied to the vibration isolation of equipment (such as precision instruments or apparatuses) and provide nonlinear isolation mechanism by the vertically or obliquely installed damper. Accordingly, the resonance characteristics of the system can be significantly reduced to avoid excessively amplified responses under resonance. Under medium or small earthquakes (smaller displacement), the system with the vertically or obliquely installed damper exhibits smaller damping ratio and effectively exerts the original performance of the isolation system, resulting in maximum isolation effect. As for large earthquakes (larger displacement), the system with the vertically or obliquely installed damper exhibits larger damping ratio to effectively control the displacement of the vibration isolation layer and provide effective damping mechanism.

The above examples are intended for illustrating the embodiments of the subject invention and the technical features thereof but not for restricting the scope of protection of the subject invention. Many other possible modifications and variations can be made without departing from the spirit and scope of the invention as hereinafter claimed. The scope of the subject invention is based on the claims as appended.

What is claimed is:

1. A geometrically nonlinear vibration isolation system, comprising:
   a bearing platform for a vibration-isolated object disposed thereon;
   an isolator connected to the bearing platform and configured to cooperate with the bearing platform for providing resilience against relative displacement in a horizontal direction between the bearing platform and the isolator; and
   a damper pin-connected to the bearing platform, wherein (i) an axis of the damper is orthogonal to or oblique to the horizontal direction when no external force is applied thereto, (ii) the relative displacement in the horizontal direction between the bearing platform and the isolator induces a change in an angle between the axis of the damper and the horizontal direction, and (iii) the damper provides a damping force along a direction parallel to the axis against the relative displacement.

2. The geometrically nonlinear vibration isolation system of claim 1, wherein the isolator is disposed under the bearing platform, and the damper has two opposite ends pin-connected to the bearing platform and the isolator, respectively.

3. The geometrically nonlinear vibration isolation system of claim 2, wherein the isolator is connected to the bearing platform by at least one sliding element, which slidably abuts and contacts a concave curved surface of at least one sliding rail.

4. The geometrically nonlinear vibration isolation system of claim 3, wherein the at least one sliding element is located at a deepest position of the curved concave surface.

5. The geometrically nonlinear vibration isolation system of claim 3, wherein (i) the isolator includes a supporting stand and the at least one sliding element, (ii) the at least one sliding rail is formed at a bottom side of the bearing platform, and (iii) the at least one sliding element is disposed between the supporting stand and the at least one sliding rail.

6. The geometrically nonlinear vibration isolation system of claim 5, wherein the supporting stand of the isolator has a bottom base and at least one bolster element erected on the bottom base, and the at least one sliding element is disposed at a top end of the at least one bolster element.

7. The geometrically nonlinear vibration isolation system of claim 6, wherein the damper is disposed vertically or obliquely between the bearing platform and the bottom base.

8. The geometrically nonlinear vibration isolation system of claim 1, wherein the axis of the damper is orthogonal to the horizontal direction when no external force is applied thereto, and an increase of the relative displacement between the bearing platform and the isolator results in larger stretching deformation of the damper and reduced slope of the axis.

* * * * *